(12) United States Patent
Li et al.

(10) Patent No.: US 10,033,514 B2
(45) Date of Patent: Jul. 24, 2018

(54) METHOD AND APPARATUS FOR PREVENTING TRANSMITTER LEAKAGE

(71) Applicant: Telefonaktiebolaget LM Ericsson (publ), Stockholm (SE)

(72) Inventors: Ming Li, Beijing (CN); Youping Su, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 117 days.

(21) Appl. No.: 15/027,445

(22) PCT Filed: Oct. 9, 2013

(86) PCT No.: PCT/SE2013/051184
§ 371 (c)(1),
(2) Date: Apr. 6, 2016

(87) PCT Pub. No.: WO2015/053668
PCT Pub. Date: Apr. 16, 2015

(65) Prior Publication Data
US 2016/0248575 A1 Aug. 25, 2016

(51) Int. Cl.
*H04L 5/14* (2006.01)
*H04B 1/12* (2006.01)
(Continued)

(52) U.S. Cl.
CPC ........... *H04L 5/1461* (2013.01); *H04B 1/123* (2013.01); *H04B 1/3805* (2013.01); *H04B 1/525* (2013.01); *H04W 88/08* (2013.01)

(58) Field of Classification Search
CPC ........... H03F 2200/372; H03F 3/45076; H03F 3/1935; H04B 1/525; H04B 15/06;
(Continued)

(56) References Cited

U.S. PATENT DOCUMENTS

| 4,811,425 A * | 3/1989 | Feerst | H03D 7/165 455/209 |
|---|---|---|---|
| 2003/0032398 A1* | 2/2003 | Harris | H03D 7/161 455/147 |

(Continued)

FOREIGN PATENT DOCUMENTS

| CN | 101114840 A | 1/2008 |
|---|---|---|
| CN | 101690368 A | 3/2010 |

(Continued)

*Primary Examiner* — Jung Liu
(74) *Attorney, Agent, or Firm* — Murphy, Bilak & Homiller, PLLC

(57) ABSTRACT

Method and transceiver arrangements for reducing a leakage signal's impact on a receiver part 320 of the transceiver arrangement 300. The leakage signal originates from a transmitter part 310 of the transceiver arrangement 300. The radio base station is adapted to communicate in a Time Division Duplex, TDD mode in a cellular network. The method comprises frequency shifting 402, by the transmitter part 310, a downlink, DL, baseband by an offset frequency, $f_c$, the DL baseband comprising DL data. Furthermore, the method comprises to mixing 404, by the transmitter part (310), the frequency shifted DL baseband with a Transmitter Local Oscillator, TX LO, frequency, $f_{LO}$ to produce a DL signal spectrum. The offset frequency, $f_c$, and the TX LO frequency $f_{LO}$ is selected such that $f_{LO}=f_{DL}-f_c$, or $f_{LO}=f_{DL}+f_c$ where $f_{DL}$ is the center frequency of the DL signal spectrum, such that the TX LO leakage signal reaching 408 the receiver part 320 is located outside, or on an edge of a UL signal spectrum when received by the receiver part 320. By frequency shifting an output frequency of a transmitter local oscillator with an offset frequency, and frequency shifting a transmitter baseband with the offset frequency, but in a reverse direction, leakage signals originating from the transmitter local oscillator may be prevented from affecting (Continued)

a receiver RF spectrum, without affecting the transmitter RF spectrum.

13 Claims, 7 Drawing Sheets

(51) Int. Cl.
  *H04B 1/525* (2015.01)
  *H04B 1/3805* (2015.01)
  *H04W 88/08* (2009.01)
(58) Field of Classification Search
  CPC ........ H04B 7/022; H04B 17/21; H04B 15/02; H03D 7/163; H03D 7/161; H03D 7/165; H03B 2202/08; H03B 2202/088; H03J 5/244; H03J 1/0008
  See application file for complete search history.

(56) References Cited

U.S. PATENT DOCUMENTS

| | | | | |
|---|---|---|---|---|
| 2003/0042984 A1* | 3/2003 | Moloudi | ................ | H03B 21/01 330/301 |
| 2003/0043933 A1* | 3/2003 | Kintis | ..................... | H04B 1/28 375/308 |
| 2005/0107051 A1* | 5/2005 | Aparin | ................... | H04B 1/525 455/126 |
| 2006/0019603 A1* | 1/2006 | Pergal | ................ | H04B 7/15542 455/15 |
| 2007/0049220 A1* | 3/2007 | Pan | ...................... | H04B 1/0475 455/127.1 |
| 2009/0233568 A1* | 9/2009 | Zhang | ................... | H04B 1/525 455/296 |
| 2010/0029289 A1* | 2/2010 | Love | ..................... | H04L 5/0041 455/450 |
| 2011/0299434 A1 | 12/2011 | Gudem et al. | | |
| 2013/0308693 A1* | 11/2013 | Li | ......................... | H04W 24/02 375/224 |
| 2014/0077904 A1* | 3/2014 | Huynh | ..................... | H03J 5/00 334/39 |
| 2014/0148109 A1* | 5/2014 | Smidth | ................. | H04B 15/04 455/114.2 |
| 2014/0273904 A1* | 9/2014 | Liu | ......................... | H04B 1/16 455/257 |

FOREIGN PATENT DOCUMENTS

| | | |
|---|---|---|
| WO | 2008089176 A1 | 7/2008 |
| WO | 2013067699 A1 | 5/2013 |

* cited by examiner

METHOD AND APPARATUS FOR PREVENTING TRANSMITTER LEAKAGE

TECHNICAL FIELD

The present disclosure relates to radio transmitters and receivers in communication networks, especially to it relates to reduction of transmitter leakage in radio base stations.

BACKGROUND

The present disclosure relates to radio transmitters and receivers in communication networks, especially to it relates to reduction of transmitter leakage in radio base stations.

In wireless communication networks, UEs (User Equipments), communicate data via radio base stations.

In this description, the term "User Equipment" will be used to denote any suitable communication terminal adapted to communicate with a radio base station. A UE may be implemented as a mobile phone, a PDA (Personal Digital Assistant), a handheld computer, a laptop computer, etc. A "radio base station" may be implanted as a NodeB, an eNodeB, a repeater, etc.

In "heterodyne" receiver structures, an incoming RF-signal is fed into a mixer where it is mixed with a local oscillator (LO) frequency. The mixer output is a down-converted version of the RF-signal of an intermediate frequency, where the LO frequency is removed from the incoming RF-signal, i.e. the RF-signal spectrum is transferred into an IF (Intermediate Frequency) spectrum.

In double conversion heterodyne systems, which are common today, a received RF-signal spectrum is frequency converted in two steps before the signal is fed into a receiver arrangement. First the received RF-signal is frequency converted from a RF frequency range into a lower first IF frequency range, and then the first IF frequency range is frequency converted into a second IF frequency range, before being A/D (Analogue-to-Digital) converted and fed into the receiver arrangement.

With reference to FIG. 1, which is a schematic block diagram, an overview of an RBS (radio base station) 100 according to the prior art will now be described.

The RBS 100 is arranged to transmit DL (Downlink) data to a plurality of UEs (User Equipments) located in a coverage of a cell which is served by the RBS 100, according to TDD (Time Division Duplex). The RBS 100 is further arranged to receive UL (Uplink) data from the UEs.

The RBS 100 comprises a transmitter part (TX) 110, a receiver part (RX) 120, and a circulator 140 which alternating connects one of the transmitter part 110 and the receiver part 120 to an antenna 130. The transmitter part 110 is arranged to receive a transmitter baseband TX Bb, frequency converting the transmitter baseband TX Bb into a transmitter RF (Radio frequency) spectrum TX RF to provide to the antenna 130, via the circulator 140. In the transmitter part 110 is further a mixer 114 arranged to frequency convert the transmitter baseband TX Bb into the transmitter RF spectrum TX RF, by mixing the transmitter baseband TX Bb with an output frequency $f_{LO}$ of a local oscillator TX LO of the RBS 100.

Upon reception of a receiver RF spectrum RX RF at the antenna 130, the circulator 140 provides the receiver RF spectrum RX RF to the receiver part 120. First, the receiver RF spectrum RX RF is frequency converted into a receiver IF (intermediate frequency) spectrum RX IF by in a first RX mixer 122 mixing the receiver RF spectrum RX RF with an output frequency of a first local oscillator RX RF LO of the RBS, resulting in the receiver IF spectrum RX IF. Then, the receiver IF spectrum RX IF is frequency converted into a receiver baseband RX Bb, by in a second RX mixer 124 mixing the receiver IF spectrum RX IF with an output frequency of a second local oscillator RX IF LO of the RBS 100.

Typically, transmitter parts and the receiver parts are isolated from each other in RBSs. However, because a sufficient isolation is difficult to achieve, a TX LO leakage signal which originates from the TX LO output signal will reach the receiver part 120. Typically, such a TX LO leakage signal reaches the receiver part 120 via radiation crosstalk within the RBS 100, or via ground connections or power connections. The TX LO leakage signal may further reach the receiver part 120 via the circulator 130.

Thus, there is a problem to prevent a TX LO leakage signal which originates from the transmitter part from affecting the receiver part.

With reference to FIGS. 2a-c, which are schematic diagrams, definitions of RF (Radio Frequency) spectrums will now be described according to the prior art.

In a transmitter part of an RBS, a transmitter RF signal spectrum TX RF will be transmitted. As described above, the transmitter RF signal spectrum TX RF originates from a transmitter baseband spectrum TX Bb which has been frequency converted by being mixed with a transmitter local oscillator signal TX LO. In FIG. 2a, the TX RF signal spectrum and the TX LO signal is shown.

In FIG. 2b, an RX operating band and a receiver RF signal spectrum RX RF are shown. The RX operating band is the available frequency band in which receiver RF signal spectrums RX RFs are possible to receive. The RX operating band is standardised by 3GPP (Third Generation Partnership program) The receiver RF signal spectrum RX RF is set by a network operator, and defines the frequency spectrum that is used for UL (Uplink) communication. In the figure is further the transmitter RF signal spectrum TX RF indicated (dashed line), and also a transmitter leakage signal TX LO, which originates from the transmitter local oscillator signal TX LO of the transmitter part.

As seen in the FIG. 2b, the transmitter local oscillator signal TX LO leakage is not within the receiver RF signal spectrum RX RF and is therefore possible from filtering out by the receiver part.

In FIG. 2c, the same RX operating band, transmitter local oscillator signal TX LO leakage, and transmitter RF signal spectrum TX RF (dashed) as shown in FIG. 2b are illustrated. The FIG. 2c differs from FIG. 2b in that the receiver RF signal spectrum RX RF is different. In this example, the receiver RF signal spectrum RX RF overlaps the frequency of the TX LO signal, and consequently, also the transmitter local oscillator signal TX LO leakage. Due to the overlap, the TX LO leakage signal will not be possible to filter out without affecting the receiver RF signal spectrum RX RF, and therefore, the transmitter local oscillator signal TX LO leakage will disturb the receiver part. Thus, there is also a need to decrease disturbances at UL communication for transceivers operating in TDD mode.

SUMMARY

It would be desirable to obtain reliable operation characteristics in telecommunication networks. It is an object of this disclosure to address at least any of the issues outlined above. Further, it is an object to provide a mechanism for reducing impact of leakage signals on receivers in transceiver arrangements. These objects may be met by a method and an arrangement according to the attached independent claims.

According to one aspect, a method performed by a transceiver arrangement of a radio base station is provided for reducing a leakage signal's impact on a receiver part of the transceiver arrangement. The leakage signal originates from a transmitter part of the transceiver arrangement. An antenna is connectable to the transmitter part and the receiver part, and the radio base station is adapted to communicate in a Time Division Duplex, TDD mode in a cellular network. The method comprises to frequency shift, by the transmitter part, a downlink, DL, baseband by an offset frequency, $f_c$, the DL baseband comprising DL data to be transmitted to a User Equipment, UE. Furthermore, the method comprises to mix, by the transmitter part, the frequency shifted DL baseband with a Transmitter Local Oscillator, TX LO, frequency, $f_{LO}$ to produce a DL signal spectrum to be transmitted to the UE. The offset frequency, $f_c$, and the TX LO frequency $f_{LO}$ is selected such that $f_{LO}=f_{DL}-f_c$, or $f_{LO}=f_{DL}+f_c$ where $f_{DL}$ is the center frequency of the DL signal spectrum, such that the TX LO leakage signal reaching the receiver part is located outside, or on an edge of, a UL signal spectrum when received by the receiver part.

The method may be performed in various nodes, e.g. in a communication network node, as a suitable radio base station, or in a User Equipment, UE. The method may be applied as well for single RF (Radio Frequency) spectrums and for multiple RF spectrums, as well in UL (Uplink) and in DL (Downlink). By selecting an appropriate offset frequency, frequency shifting an output frequency of a transmitter local oscillator with the offset frequency, and frequency shifting a transmitter base band with the offset frequency, but in a reverse direction, leakage signals originating from the transmitter local oscillator may be prevented from affecting a receiver RF spectrum, without affecting the transmitter RF spectrum.

It is to be noted that according to another aspect, a corresponding transceiver arrangement which is adapted to perform the described method in a radio base station or a UE is also applicable.

BRIEF DESCRIPTION OF DRAWINGS

The solution will now be described in more detail by means of exemplary embodiments and with reference to the accompanying drawings, in which.

DESCRIPTION

In a heterodyne transceiver arrangements there is a need to reduce disturbance from transmitter local oscillators on receivers.

By frequency shifting a DL (Downlink) base band with an offset frequency, and frequency shifting a transmitter local oscillator signal with the corresponding offset frequency, but in the opposite direction, before mixing the DL base band with the transmitter local oscillator signal, a leakage of the transmitter local oscillator signal which reaches the receiver will be outside a receiver RF signal spectrum. The leakage of the transmitter local oscillator signal will then be able to filter out in the receiver.

Figure 1:
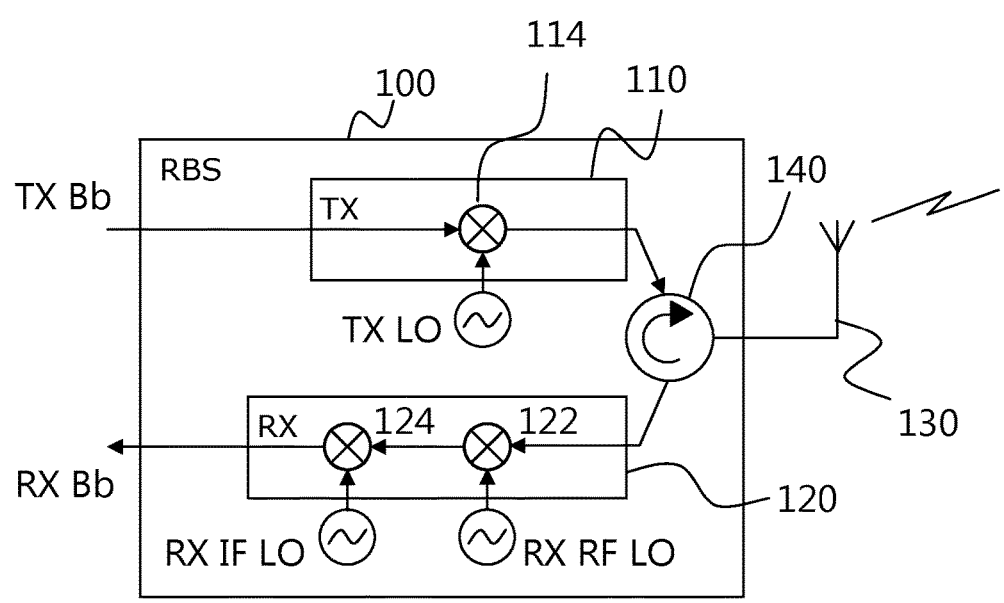
FIG. 1 is a schematic block diagram of an arrangement in accordance with the prior art.
Figure 2A:
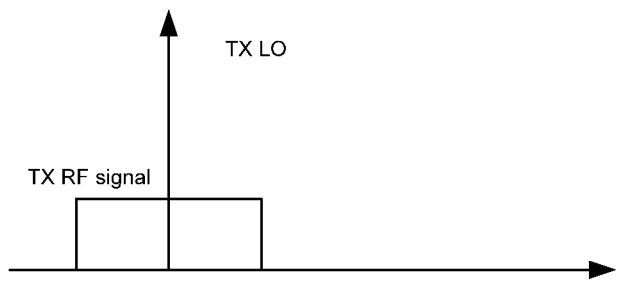
FIG. 2a-c are schematic graphs of signal spectrums, in accordance with the prior art.
Figure 2B:
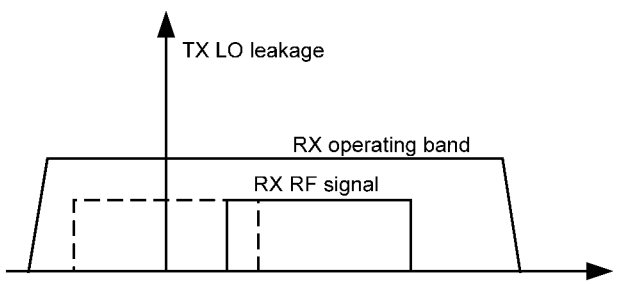
Figure 2C:
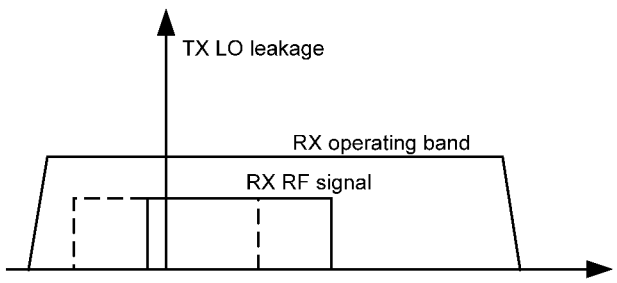
Figure 3A:
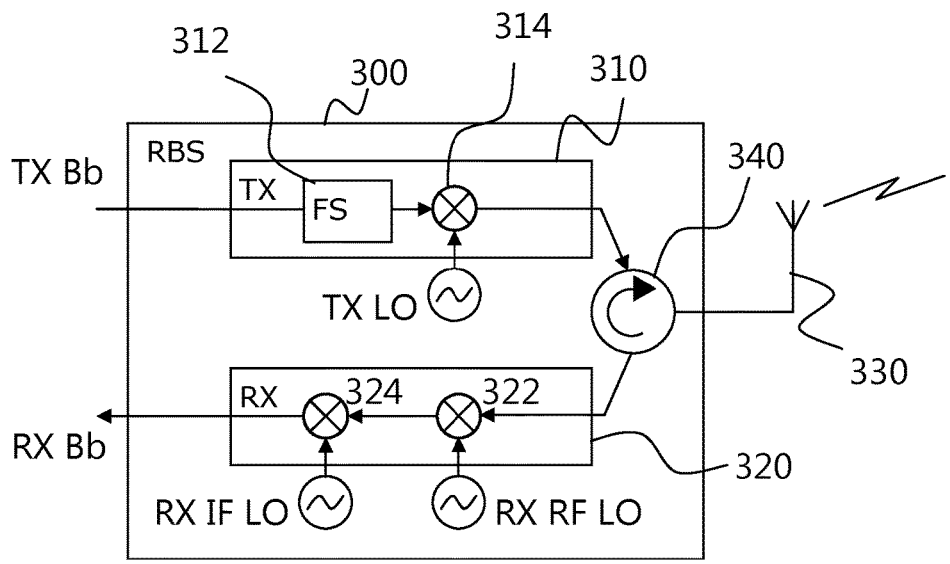
FIG. 3a-b are schematic block diagrams of arrangements, according to possible embodiments.

With reference to FIG. 3a, which is a schematic block diagram, a transceiver arrangement 300 of a radio base station will now be described, in accordance with one exemplifying embodiment.

The transceiver arrangement 300 comprises a transmitter part (TX) 310, a receiver part (RX) 320, and a circulator 340 which alternating connects one of the transmitter part 310 and the receiver part 320 to an antenna 330. The transmitter part 310 is arranged to receive a transmitter baseband TX Bb, frequency converting the transmitter baseband TX Bb into a transmitter RF (Radio frequency) spectrum TX RF to provide to the antenna 330, via the circulator 340. A frequency shifting unit 312 is arranged in the transmitter part 310 to shift the frequency of the transmitter baseband TX Bb with an offset frequency $f_c$. The frequency shifting unit 312 may be implemented by means of a digital signal processor. An output of the frequency shifting unit 312 is connected to a first input of a TX mixer 314, which is arranged to mix the frequency shifted transmitter baseband with a transmitter local oscillator TX LO output signal $f_{LO}$. The mixing results in a transmitter RF signal spectrum $f_{DL}$, which is an RF version of the transmitter baseband TX Bb, up-converted in frequency with the frequency $f_{LO}$. The output of the TX mixer 314 $f_{DL}$ is connected to the circulator 340 to be emitted by the antenna 330.

Upon reception of a receiver signal spectrum RX RF at the antenna 330, the circulator 340 provides the receiver signal spectrum RX RF to the receiver part 320. In this embodiment, the receiver spectrum RX RF and the transmitter spectrum TX RF overlap each other. However, due to the above described frequency shifting of the transmitter local oscillator TX LO output signal $f_{LO}$, leakage parts of the transmitter local oscillator TX LO output signal TX LO leakage will be prevented from being located within the receiver signal spectrum RX RF. Because both the transmitter base band TX Bb and the receiver TX LO output are frequency shifted with the corresponding offset frequency, but offset frequencies have opposite signs, the resulting transmitter RF signal spectrum RX RF will not be affected by the frequency shiftings. Thus, the TX LO and, consequently, the TX LO leakage could be prevented from affecting the receiver part. Furthermore, the receiver part 320 comprises a mixer 322 which is arranged to frequency converting the receiver RF spectrum RX RF into a receiver IF (intermediate frequency) spectrum RX IF by mixing with an output of a receiver RF local oscillator RX RF LO. The receiver part 320 comprises also another mixer 324 which is arranged to frequency converting the receiver IF spectrum RX IF into a receiver baseband RX Bb by mixing with an output of a receiver IF local oscillator RX IF LO.

Figure 3B:
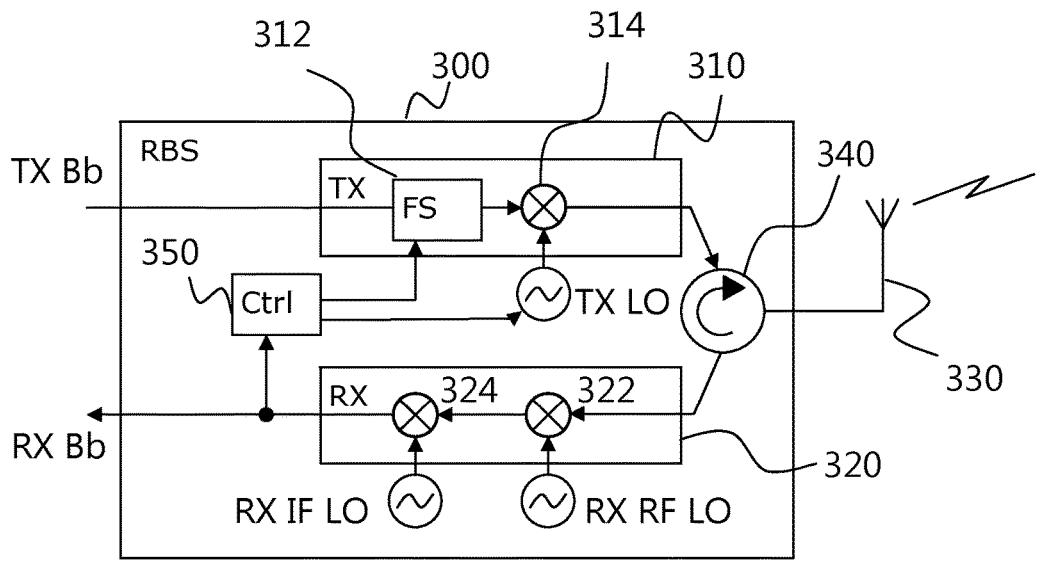

With reference to FIG. 3b, which is a schematic block diagram, another transceiver arrangement 300 of a radio base station will now be described, in accordance with one alternative exemplifying embodiment.

This alternative embodiment is based on the embodiment described above with reference to FIG. 3a, and the corresponding reference marks have been applied where appropriate. The transceiver arrangement 300 of this embodiment differs from the transceiver arrangement described with reference to FIG. 3a in that, in addition, a frequency shift manager 350 is arranged to control the frequency shifting of the transmitter base band TX Bb and the frequency shifting of the transmitter local oscillator TX LO output frequency.

An input of the frequency shift manager 350 is connected to an output of the receiver part 320 to monitor the receiver base band RX Bb which is outputted by the receiver part 320. By monitoring the receiver base band RX Bb, and comparing with the present transmitter local oscillator TX LO output signal $f_{LO}$, the frequency shift manager 340 is enabled to detect deviations of the transmitter local oscillator TX LO output signal, and adjust the offset frequency $f_C$ and transmitter local oscillator TX LO output signal $f_{LO}$, respectively.

It is to be noted that the frequency shift manager 350 is not limited to monitor the receiver RF spectrum RX RF. A designer may instead apply the receiver IF spectrum RX IF, the receiver baseband RX Bb, or any suitable combination instead, within the present concept.

In addition, the offset frequency $f_C$ and the transmitter local oscillator TX LO output signal $f_{LO}$ may be initially set by the frequency shift manager 340.

Even if the above described exemplifying embodiments relates to transceiver arrangements in radio base stations, the present solution is not limited to radio base stations only. The present transceiver arrangement 300 may be implemented in alternative nodes within the disclosed concept. For instance, a designer may implement the transceiver arrangement 300 in a UE (User Equipment), when appropriate. When implementing the transceiver arrangement 300 in a UE, the transmitter baseband TX Bb comprises UL (Uplink) data instead of DL data, and the TX LO frequency $f_{LO}$ and offset frequency $f_c$ are selected such that leakage signals originating from the transmitter local oscillator TX LO will be located on the edge or outside a receiver RF spectrum, which comprises DL data.

Figure 4:
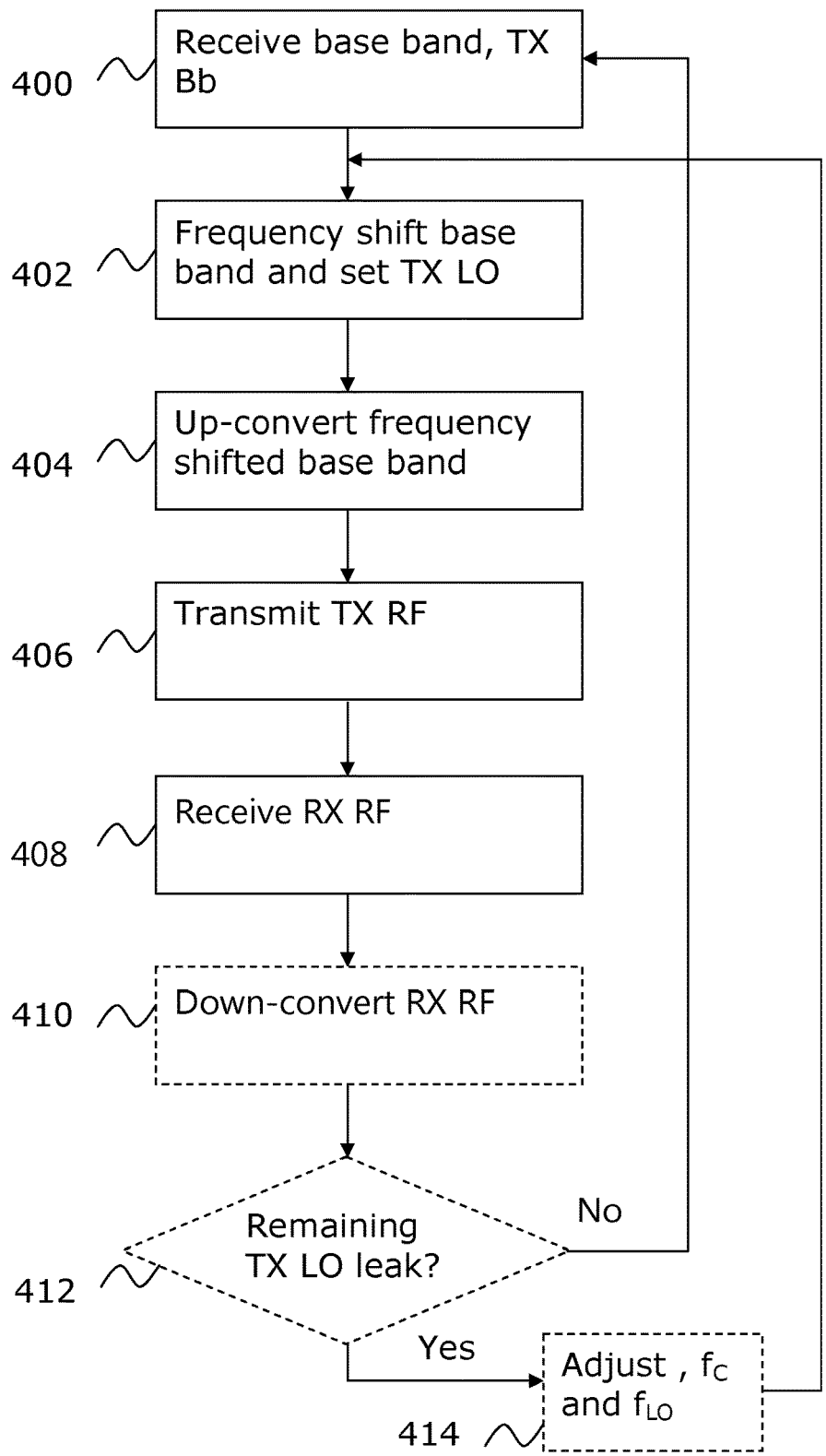
FIG. 4 is a schematic flow chart of a method, according to a possible embodiment.

With reference to FIG. 4, which is a schematic flow chart, a method of an RBS (radio base station) will now be described, in accordance with one exemplifying embodiment.

In a first action 400, a transmitter part of the radio base station receives a transmitter baseband TX Bb. The transmitter baseband TX Bb comprises DL (Downlink) data to be transmitted to a UE (User Equipment).

In a subsequent action 402, the transmitter baseband TX Bb is frequency shifted by an offset frequency $f_C$, and in another action 404, the frequency shifted base band is mixed with an output signal of a transmitter local oscillator TX LO, which results in a transmitter RF (Radio Frequency) spectrum TX RF to be transmitted to the UE, i.e. an up-converted version of the frequency shifted baseband TX Bb. The frequency $f_{LO}$ of the output signal of the transmitter local oscillator TX LO is selected to be outside a receiver RF spectrum RX RF which will be received from the UE.

In a following action 406, the transmitter RF spectrum TX RF, i.e. downlink data, is transmitted as a radio frequency spectrum.

In another action 408, the receiver RF spectrum RX RF is received.

As described above, due to the selection of the output frequency $f_{LO}$ of the transmitter local oscillator TX LO, any leakages from the transmitter local oscillator TX LO which reaches the receiver will be able to differentiate, and filtering out, before of after the receiver RF spectrum has been down-converted in an optional following action 410.

Thereby, the leakage parts will be prevented from disturbing the receiver RF spectrum RX RF.

In an alternative exemplifying embodiment, which is based on the above described embodiment, in an action 412, which is performed after the action 410, the radio base station monitors the receiver baseband RX Bb in order to detect any remaining transmitter local oscillator TX LO leakage. In case of detecting such a remaining transmitter local oscillator TX LO leakage, the radio base station adjusts the offset frequency $f_C$ and transmitter local oscillator frequency $f_{LO}$ in a following action 414, and applies the adjusted frequencies $f_C$, $f_{LO}$ when proceeding frequency shifting the receiver baseband RX Bb and setting the transmitter local oscillator frequency $f_{LO}$, in the action 402.

Else, when no remaining transmitter local oscillator TX LO leakage is detected in action 412, the radio base station proceed receiving the transmitter baseband, in action 400.

It is to be noted that the described method may be implemented different within the present concept. For instance a designer may select to perform the detection of transmitter local oscillator TX LO leakage on the receiver baseband RX Bb, or on any suitable intermediate frequency signal spectrum, when appropriate.

Furthermore, correspondingly, as discussed in some embodiments above, the described method may be amended to be applied also in alternative nodes, within the present concept. For instance, a corresponding method may by implemented for a transceiver arrangement in a UE.

Figure 5:
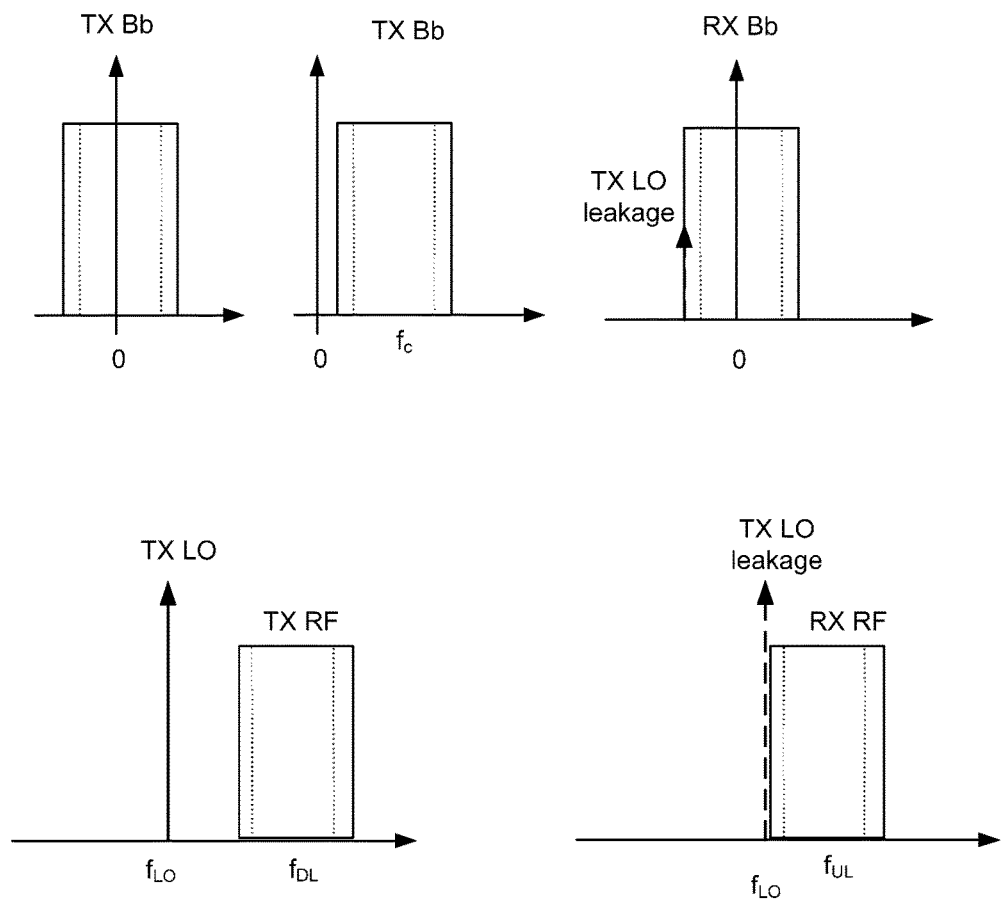
FIG. 5 is a schematic graph of frequency spectrums, according to possible embodiments.

With reference to FIG. 5, which comprises schematic graphs, a principle solution of a method in a radio base station will now be described, in accordance with one exemplifying embodiment.

A transmitter baseband TX Bb which comprises DL (Downlink) data to be transmitted is illustrated in the upper left graph. The middle left graph illustrates also the transmitter baseband TX Bb, however after being frequency shifted by an offset frequency $f_C$.

In the lower left graph a transmitter RF (Radio Frequency) spectrum TX RF is illustrated together with a transmitter local oscillator TX LO output frequency $f_{LO}$, and in the lower right graph a receiver RF spectrum RX RF is illustrated together with a leakage signal (dashed line) which originates from the transmitter local oscillator TX LO and arrives at a receiver of the radio base station. The center frequency of the transmitter RF spectrum is $f_{DL}$ and the center frequency of the receiver RF spectrum is $f_{UL}$.

As seen in the two lower figures, the output frequency of the transmitter local oscillator TX LO is selected to be outside the receiver RF spectrum.

Finally, the upper right graph illustrates a receiver baseband RX Bb, which is a result of a down-conversion of the receiver RF spectrum RX RF. The receiver baseband comprises UL (Uplink) data.

In this embodiment, the DL data occupies one transmitter baseband TX Bb and also one transmitter RF spectrum TX RF, and the UL data occupies one receiver baseband RX Bb and also one receiver RF spectrum RX RF. The offset frequency and the transmitter local oscillator frequency are then selected according to the formulas:

$$f_c = +/-(f_{DL}-f_{UL}-\text{Bandwidth}_{UL}/2), \text{ and}$$

$$f_{LO}=f_{DL}-f_c, \text{ or } f_{LO}=f_{DL}+f_c, \text{ where}$$

$\text{Bandwidth}_{UL}$ is the UL signal spectrum, i.e. the receiver RF spectrum RX RF.

Even if it is illustrated in FIG. 5 that the offset frequency $f_C>0$ and that the transmitter local oscillator frequency $f_{LO}<f_{DL}$, it is to be noted that these frequencies may by selected alternatively. For instance, may the frequencies be selected as $f_C<0$ and $f_{LO}>f_{DL}$, within the disclosed concept.

In the above described embodiment one frequency spectrum is used in UL and one frequency spectrum is used in DL, which sometimes is referred to as single carrier arrangements. However, the disclosed concept may also be applied for arrangements which uses multiple frequency spectrums for DL transmission and/or UL transmission, i.e. a so called multiple carrier arrangements.

In an alternative exemplifying embodiment, which is based on some above described embodiments, the present solution is implemented in a UE instead of a radio base station. The equations for $f_c$ and $f_{LO}$ will then instead be defined as:

$$f_c=+/-(f_{UL}-f_{DL}-\text{Bandwidth}_{DL}/2), \text{ and}$$

$$f_{LO}=f_{UL}-f_c, \text{ or } f_{LO}=f_{UL}+f_c, \text{ where}$$

Bandwidth$_{DL}$ is the DL signal spectrum, i.e. the receiver RF spectrum RX RF.

Figure 6:
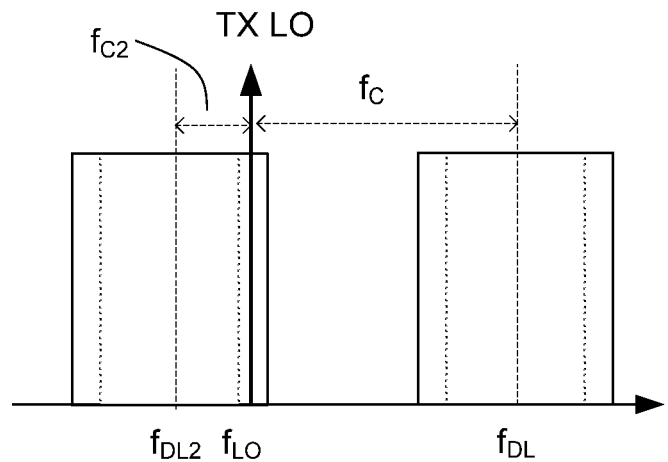
FIG. 6 is a schematic graph of frequency spectrums, according to possible embodiments.
Figure 6:
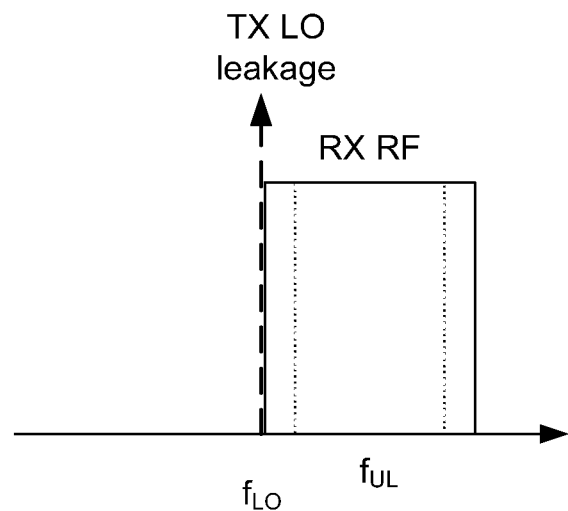

With reference to FIG. 6, which comprises schematic graphs, a principle solution of a method in a radio base station will now be described, in accordance with one exemplifying embodiment.

In this embodiment, a transmitter baseband TX Bb uses two frequency spectrums for transmitting DL (Downlink) data and one frequency spectrum for receiving UL (Uplink) data. In the upper graph, the two transmitter RF spectrums with their respective center frequencies $f_{DL}$ and $f_{DL2}$ are illustrated together with the transmitter local oscillator TX LO frequency $f_{LO}$. The first transmitter RF spectrum is frequency shifted with a first offset frequency $f_C$ and the second transmitter RF spectrum is frequency shifted by a second offset frequency $f_{C2}$.

In the lower graph, the receiver RF spectrum and a transmitter local oscillator TX LO leakage signal which reaches the receiver illustrated. The offset frequencies $f_C$, $f_{C2}$ and the transmitter local oscillator frequency $f_{LO}$ are then selected according to the formulas:

$$f_c=(f_{UL}-\text{Bandwidth}_{UL}/2)-f_{DL},$$

$$f_{c2}=f_{DL2}-(f_{UL}-\text{Bandwidth}_{UL}/2), \text{ and}$$

$$f_{LO}=f_{DL}+f_c=f_{DL2}-f_{c2},$$

where $f_{DL2}$ is the center frequency of the second DL signal spectrum, $f_{UL}$ is the center frequency of the UL signal spectrum, and Bandwidth$_{UL}$ is the bandwidth of the UL signal spectrum.

Figure 7:
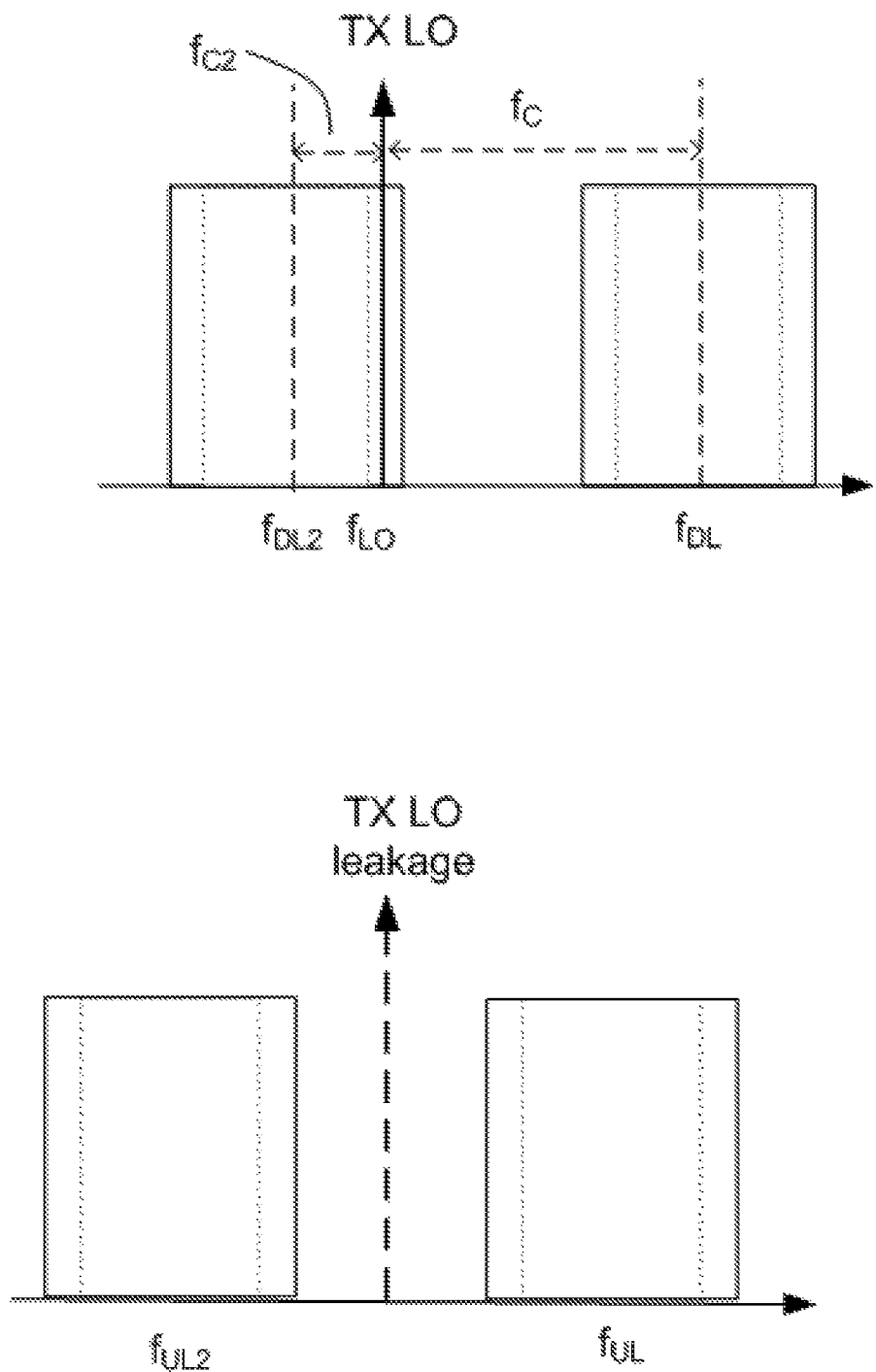
FIG. 7 is a schematic graph of frequency spectrums, according to possible embodiments.

With reference to FIG. 7, which comprises schematic graphs, a principle solution of a method in a radio base station will now be described, in accordance with one exemplifying embodiment.

In this embodiment, a transmitter baseband TX Bb uses two frequency spectrums for transmitting DL (Downlink) data and two frequency spectrums for receiving UL (Uplink) data. In the upper graph, the two transmitter RF spectrums are illustrated together with the transmitter local oscillator TX LO frequency $f_{LO}$. The center frequencies $f_{DL}$ and $f_{DL2}$, respectively, are illustrated. The first transmitter RF spectrum is frequency shifted with a first offset frequency $f_C$ and the second transmitter RF spectrum is frequency shifted by a second offset frequency $f_{C2}$. In the graph is also the output frequency $f_{LO}$ of the transmitter local oscillator TX LO shown.

In the lower graph, two receiver RF spectrum and a transmitter local oscillator TX LO leakage signal which reaches the receiver is illustrated. The offset frequencies $f_C$, $f_{C2}$ and the transmitter local oscillator frequency $f_{LO}$ are then selected according to the formulas:

$$f_c=((f_{UL}-\text{Bandwidth}_{UL}/2)+(f_{UL2}-\text{Bandwidth}_{UL2}/2))/2-f_{DL}$$

$$f_{c2}=f_{DL2}-((f_{UL}-\text{Bandwidth}_{UL}/2)+(f_{UL2}-\text{Bandwidth}_{UL2}/2))/2$$

$$f_{LO}=f_{DL}+f_{c1}=f_{DL}-f_{c2},$$

where $f_{DL2}$ is the center frequency of the second DL signal spectrum, $f_{UL}$ is the center frequency of the UL signal spectrum, Bandwidth$_{UL}$ is the bandwidth of the UL signal spectrum $f_{UL2}$ is the center frequency of the second UL signal spectrum, and Bandwidth$_{UL2}$ is the bandwidth of the second UL signal spectrum.

It is also to be noted that a designer may select to implement the present solution also in transceiver arrangements of UEs, as well for single RF spectrums and for multiple RF spectrums, correspondingly, to some above described exemplifying embodiments, when appropriate.

Reference throughout the specification to "one embodiment" or "an embodiment" is used to mean that a particular feature, structure or characteristic described in connection with an embodiment is included in at least one embodiment. Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, the invention is limited only by the accompanying claims and other embodiments than the specific above are equally possible within the scope of the appended claims. Moreover, it should be appreciated that the terms "comprise/comprises" or "include/includes", as used herein, do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way. The scope is generally defined by the following independent claims.

Exemplifying embodiments are defined by the dependent claims.

The invention claimed is:

1. A method performed by a transceiver arrangement of a radio base station of reducing a leakage signal's impact on a receiver part of the transceiver arrangement, the leakage signal originating from a transmitter part of the transceiver arrangement, wherein an antenna is connectable to the transmitter part and the receiver part, and the radio base station is configured to communicate in a Time Division Duplex (TDD) mode in a cellular network, the method comprising:

frequency shifting, by the transmitter part, a downlink (DL) baseband by an offset frequency, $f_c$, the DL baseband comprising DL data to be transmitted to a User Equipment (UE); and mixing, by the transmitter part, the frequency shifted DL baseband with a Transmitter Local Oscillator (TX LO) frequency, $f_{LO}$ to produce a DL signal spectrum to be transmitted to the UE;

wherein the offset frequency, $f_c$, and the TX LO frequency $f_{LO}$ is selected such that $f_{LO} = f_{DL} - f_c$, or $f_{LO} = f_{DL} + f_c$, where $f_{DL}$ is the center frequency of the DL signal spectrum, such that the TX LO leakage signal reaching the receiver part is located outside, or on an edge of, a UL signal spectrum when received by the receiver part.

2. The method according to claim 1, further comprising determining by an offset control unit if the leakage signal is located within the UL signal spectrum, and when the leakage signal is located within the UL signal spectrum adjusting the offset frequency $f_c$ based on the determination.

3. The method according to claim 2, further comprising adjusting the TX LO frequency $f_{LO}$ based on the determination.

4. The method according to claim 1, wherein the offset frequency $f_c$ is selected such that $f_c = +/-(f_{DL} - f_{UL} - \text{Bandwidth}_{UL}/2)$, where $\text{Bandwidth}_{UL}$ is the bandwidth of the UL signal spectrum.

5. The method according to claim 1, wherein a second DL baseband comprises further DL data to be transmitted, the second DL baseband is frequency shifted by a second offset frequency, $f_{c2}$, the frequency shifted second DL baseband is mixed with the TX LO frequency $f_{LO}$ to produce a second DL signal spectrum to be transmitted to the UE, and wherein $f_c = (f_{UL} - \text{Bandwidth}_{UL}/2) - f_{DL}$, $f_{c2} = f_{DL2} - (f_{UL} - \text{Bandwidth}_{UL}/2)$, and $f_{LO} = f_{DL} + f_c = f_{DL2} - f_{c2}$, where $f_{DL2}$ is the center frequency of the second DL signal spectrum, $f_{UL}$ is the center frequency of the UL signal spectrum, and $\text{Bandwidth}_{UL}$ is the bandwidth of the UL signal spectrum.

6. The method according to claim 1, wherein a second DL baseband comprises further DL data to be transmitted, the second DL baseband is frequency shifted by a second offset frequency, $f_{c2}$, the frequency shifted second DL baseband is mixed with the TX LO frequency $f_{LO}$ to produce a second DL signal spectrum to be transmitted to the UE, and wherein $f_c = ((f_{UL} - \text{Bandwidth}_{UL}/2) + (f_{UL2} - \text{Bandwidth}_{UL2}/2))/2 - f_{DL}$, $f_{c2} = f_{DL2} - ((f_{UL} - \text{Bandwidth}_{UL}/2) + (f_{UL2} - \text{Bandwidth}_{UL2}/2))/2$ $f_{LO} f_{DL} + f_{c1} = f_{DL} - f_{c2}$, where $f_{DL2}$ is the center frequency of the second DL signal spectrum, $f_{UL}$ is the center frequency of the UL signal spectrum, $\text{Bandwidth}_{UL}$ is the bandwidth of the UL signal spectrum, $f_{UL2}$ is the center frequency of the second UL signal spectrum, and $\text{Bandwidth}_{UL2}$ is the bandwidth of the second UL signal spectrum.

7. A transceiver arrangement of a radio base station configured to reduce a leakage signal's impact on a receiver part of the transceiver arrangement, the leakage signal originating from a Transmitter Local Oscillator (TX LO) of a transmitter part of the transceiver arrangement, the radio base station comprising an antenna being connectable to the transmitter part and the receiver part, and the radio base station is configured to communicate in a Time Division Duplex (TDD) mode in a cellular network, wherein the transmitter part comprises:

a frequency offset unit configured to frequency shift a downlink, DL, baseband by an offset frequency, $f_c$, the DL baseband comprising DL data to be transmitted to a User Equipment, UE; and a transmitter mixer configured to mix the frequency shifted DL baseband with a TX LO frequency, $f_{LO}$ to produce a DL signal spectrum to be transmitted to the UE via the antenna;

wherein the radio base station is further configured to select the offset frequency $f_c$ and the TX LO frequency $f_{LO}$ such that $f_{LO} = f_{DL} - f_c$, or $f_{LO} = f_{DL} + f_c$, where $f_{DL}$ is the center frequency of the DL signal spectrum, such that the TX LO leakage signal reaching the receiver part is located outside, or on an edge of, a UL signal spectrum when received by the receiver part.

8. The transceiver arrangement according to claim 7, further comprising an offset control unit configured to determine if the leakage signal is located within the UL signal spectrum, and adjust the offset frequency L based on the determination, when the leakage signal is located within the UL signal spectrum.

9. The transceiver arrangement according to claim 8, wherein the offset control unit is further configured to adjust the TX LO frequency $f_{LO}$ based on the determination.

10. The transceiver arrangement according to claim 7, wherein the transceiver arrangement is configured to select the offset frequency $f_c$ such that $f_c = +/-(f_{DL} - f_{UL} - \text{Bandwidth}_{UL}/2)$, where $\text{Bandwidth}_{UL}$ is the bandwidth of the UL signal spectrum.

11. The transceiver arrangement according to claim 7, wherein a second DL baseband comprises further DL data to be transmitted, the transmitter part is further configured to frequency shift the second DL baseband by a second offset frequency, $f_{c2}$, and mix the frequency shifted second DL baseband with the TX LO frequency $f_{LO}$ to produce a second DL carrier to be transmitted to the UE, such that $f_c = (f_{UL} - \text{Bandwidth}_{UL}/2) - f_{DL}$, $f_{c2} = f_{DL2} - (f_{UL} - \text{Bandwidth}_{UL}/2)$, and $f_{LO} = f_{DL} + f_c = f_{DL2} - f_{c2}$, where $f_{DL2}$ is the center frequency of the second DL signal spectrum, $f_{UL}$ is the center frequency of the UL signal spectrum, and $\text{Bandwidth}_n$ is the bandwidth of the UL signal spectrum.

12. The transceiver arrangement according to claim 7, wherein a second DL baseband comprises further DL data to be transmitted, and the transmitter part is further configured to frequency shift the second DL baseband by a second offset frequency, $f_{c2}$, and mix the frequency shifted second DL baseband with the TX LO frequency $f_{LO}$ to produce a second DL carrier to be transmitted to the UE, such that $f_c = ((f_{UL} - \text{Bandwidth}_{UL}/2) + (f_{UL2} - \text{Bandwidth}_{UL2}/2))/2 - f_{DL}$, $f_{c2} = f_{DL2} - ((f_{UL} - \text{Bandwidth}_{UL}/2) + (f_{UL2} - \text{Bandwidth}_{UL2}/2))/2$ $f_{LO} f_{DL} + f_{c1} = f_{DL} - f_{c2}$, where $f_{DL2}$ is the center frequency of the second DL signal spectrum, $f_{UL}$ is the center frequency of the UL signal spectrum, Bandwidth$_{UL}$ is the bandwidth of the UL signal spectrum, $f_{UL2}$ is the center frequency of the second UL signal spectrum, and Bandwidth$_{UL2}$ is the bandwidth of the second UL signal spectrum.

13. A transceiver arrangement of a User Equipment (UE) configured to reduce a leakage signal's impact on a receiver part of the transceiver arrangement, the leakage signal originating from a Transmitter Local Oscillator (TX LO) of a transmitter part of the transceiver arrangement, the UE comprising an antenna being connectable to the transmitter part and the receiver part, and being configured to communicate in a Time Division Duplex (TDD) mode in a cellular network, wherein the transmitter part, comprises:
a frequency offset unit configured to frequency shift an uplink, UL, baseband by an offset frequency, $f_c$, the UL baseband comprising UL data to be transmitted to a Radio Base Station, RBS; and a transmitter mixer configured to mix the frequency shifted UL baseband with a TX LO frequency, $f_{LO}$ to produce a UL signal spectrum to be transmitted to the RBS via the antenna;

wherein the transceiver arrangement is further configured to select the offset frequency $f_c$ and the TX LO frequency $f_{LO}$ such that $$f_{LO}=f_{UL}-f_c, \text{ or } f_{LO}=f_{UL}+f_c,$$

where $f_{UL}$ is the center frequency of the UL signal spectrum, such that the TX LO leakage signal reaching the receiver part is located outside, or on an edge of, a DL signal spectrum when received by the receiver part.

* * * * *